United States Patent
Sett

(10) Patent No.: US 6,637,456 B2
(45) Date of Patent: Oct. 28, 2003

(54) SAFETY VALVE

(75) Inventor: Manfred Sett, Kempen (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 24 days.

(21) Appl. No.: 09/999,441

(22) Filed: Nov. 27, 2001

(65) Prior Publication Data

US 2002/0066486 A1 Jun. 6, 2002

(30) Foreign Application Priority Data

Dec. 4, 2000 (DE) ......................................... 100 60 311

(51) Int. Cl.[7] ........................... F16K 17/12; F16K 21/12
(52) U.S. Cl. .................. 137/514.3; 137/375; 137/529; 137/533.27
(58) Field of Search ............................ 137/514.3, 529, 137/533.27, 533.31, 543.15, 375

(56) References Cited

U.S. PATENT DOCUMENTS

| | | | | |
|---|---|---|---|---|
| 609,726 A | * | 8/1898 | Ball | 137/514.3 |
| 843,988 A | * | 2/1907 | Barton | 137/514.3 |
| 1,105,255 A | * | 7/1914 | Caskey | 137/514.3 |
| 1,373,906 A | * | 4/1921 | Needham | 137/514.3 |
| 1,400,011 A | * | 12/1921 | Baker | 137/514.3 |
| 1,474,192 A | * | 11/1923 | Gessler et al. | 137/529 |
| 1,795,749 A | * | 3/1931 | Winters | 137/533.27 |
| 2,490,511 A | * | 12/1949 | Courtot | 137/514.3 |
| 3,850,405 A | * | 11/1974 | White | 137/533.27 |
| 4,274,436 A | * | 6/1981 | Smith | 137/375 |
| 4,308,887 A | * | 1/1982 | van Bogaert | 137/533.27 |
| 4,572,233 A | * | 2/1986 | Weeden | 137/375 |
| 6,123,102 A | * | 9/2000 | Loegel, Sr. | 137/529 |
| 6,532,987 B1 | * | 3/2003 | Itoh et al. | 137/514.5 |

FOREIGN PATENT DOCUMENTS

| GB | 4175 | * 12/1873 | ................. 137/529 |
|---|---|---|---|

* cited by examiner

Primary Examiner—John Rivell
(74) Attorney, Agent, or Firm—RatnerPrestia

(57) ABSTRACT

The invention concerns a safety valve, in particular for low pressures and aggressive media, with an inlet which ends at the top in a valve seat upon which lies in a sealing manner a weight-loaded sealing body. A certain overpressure below the valve seat and/or a certain underpressure above the valve seat causes the sealing body to lift. At its upper end, the sealing body forms a shaft projecting vertically upward which is guided along or in a vertical part fixed immovably to the valve body. Fastened along or on top of the shaft are two or more weights, particularly detachable weights.

5 Claims, 1 Drawing Sheet

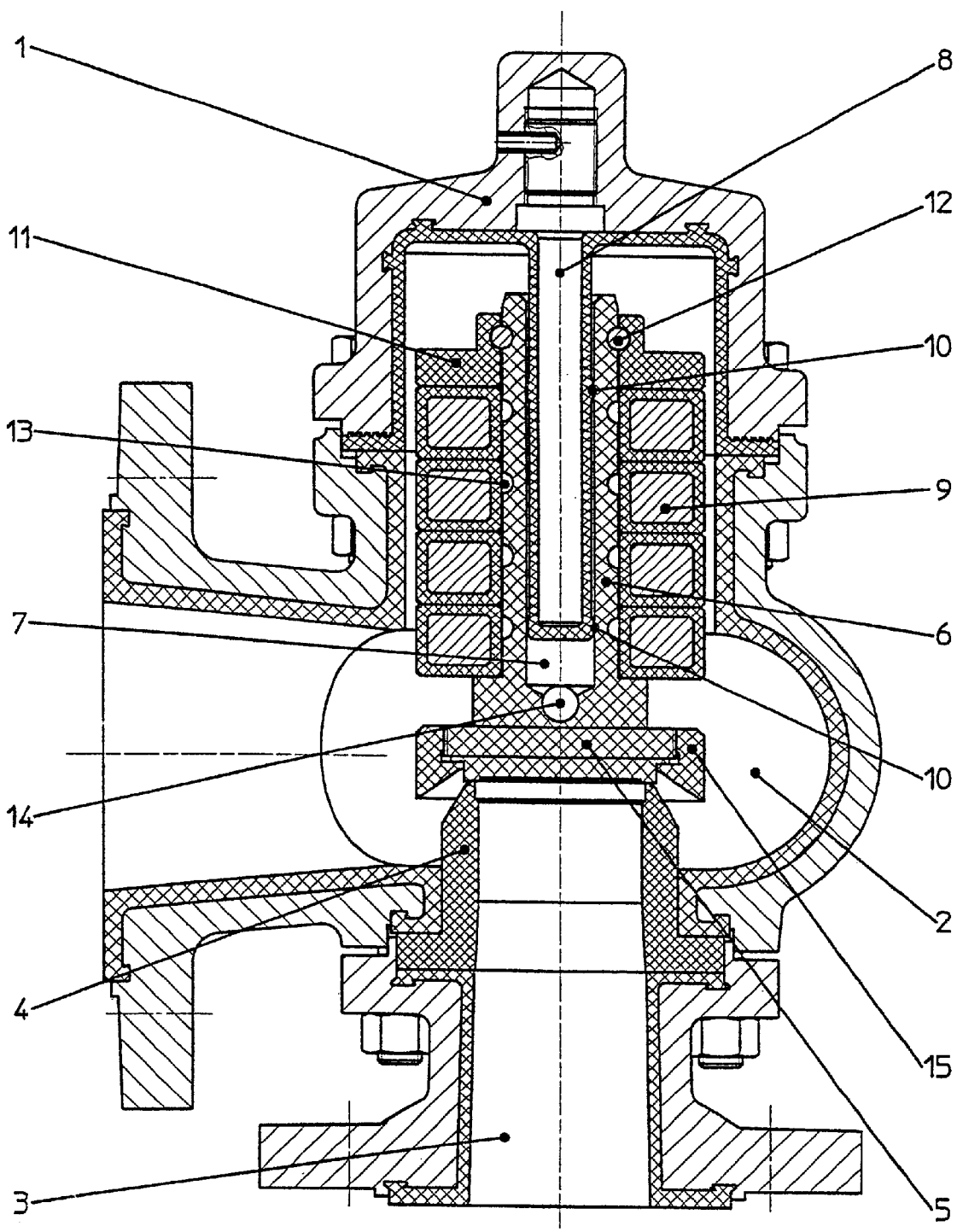

SAFETY VALVE

The invention concerns a safety valve, in particular for low pressures and aggressive media, with an inlet which ends at the top in a valve seat upon which lies in a sealing manner a weight-loaded sealing body, whereby a certain overpressure below the valve seat and/or a certain underpressure above the valve seat causes the sealing body to lift.

Low-pressure safety valves are used for pressure safety against overpressure or vacuum in pressure systems, for example reservoirs, boilers, pipelines. These low pressures lie in the region of <200 mbar. Since pressure safety with highly aggressive and environmentally critical media requires hermetic sealing of the valve to the atmosphere, such low-pressure valves are usually designed in such a way that the component, for example a spring or a weight, loading the sealing body, in particular the valve plug, is placed directly in the product-contacting space of the valve body. In this way, one avoids stem lead-throughs to the atmosphere which have to be sealed off with sealing elements such as bellows or a diaphragm. The materials resistant to highly aggressive media, for example Hastelloy, PTFE, etc., result in bellows/diaphragms whose operating force is so large due to spring stiffness, that this force acts counter to the effective valve opening or closing force in the low-pressure range and disturbs the valve function.

A weight-loaded low-pressure safety valve is known in which the valve plug has a cylindrical shaft guided in a bore arranged in the valve bonnet. Due to the necessary clearance and the relatively great distance of the lodging point from the sealing surface of the seat/plug shut-off element, an eccentricity of the valve plug axis relative to the valve seat axis develops. This poor centering leads to an irregular distribution of forces at the valve plug and hence to a tilting to one side during opening of the valve. This results in leakage even before the trip pressure is reached and a jamming of the guide due to tilting.

Another valve design employs a valve plug with guide webs which is inserted in the valve seat bore. This design has the disadvantage of narrowing the valve cross-section due to the guide webs and thus reducing the valve performance. In addition, the elevated center of gravity of the weight arranged above the valve plug causes the valve plug to tilt or jam during opening. The weight loading the valve plug is designed to match a defined valve trip pressure. Any subsequent change requires the weight to be replaced or reworked. The weight is manufactured either from metal or plastic. When used for highly aggressive media, metallic weights made from special materials, for example Hastelloy, tantalum, zirconium, etc., are required, which are correspondingly costly. If weights made of resistant plastics, for example PTFE, are used, the low density of the plastic relative to the metal leads to large-volume weights and hence to large-volume valve bodies.

The object of the invention is to improve a safety valve of the kind mentioned at the outset in such a way that it moves very smoothly in all operating conditions while providing a high degree of sealing. A further object of the invention is to ensure that the total weight loading the sealing body can be easily adjusted and varied.

These problems are solved according to the invention in that, at its upper end, the sealing body forms a shaft projecting vertically upward which is guided along or in a vertical part fixed immovably to the valve body and that two or more weights, particularly detachable weights, are fastened to or on top of the shaft.

The shaft of the sealing body is so reliably guided that a great smoothness of motion is achieved. The weight of the sealing body can also be very precisely determined by the number and the selected weight of the individual weights.

It is preferentially proposed that the shaft projecting upward comprises a vertical inner bore open at the top in which lies a rod fixed to the valve body. It is also advantageous when the rod is jacketed with a material resistant to aggressive media.

Simple manufacture and assembly are achieved when annular weights lie one above the other on the shaft, surrounding the shaft. It is also advantageous when the weights are jacketed with or consist of a material resistant to aggressive media.

A secure hold of the weights is achieved when a disc, particularly of a material resistant to aggressive media, lies above the weights, which is secured on the shaft by a round cord or a circlip.

Exact locking in place of the weights and especially the annular disc is achieved irrespective of the number of weights when the outer side of the shaft comprises several annular grooves spaced at distances corresponding to the weight heights.

The smoothness of motion of the sealing body is improved when the guide rod contacts the inner bore of the shaft via only two annular projections. It is furthermore advantageous when the inner recess of the shaft is connected with the valve interior space by at least one venting bore.

In order to ensure that the sealing body does not close immediately after opening it is proposed that the sealing body comprise on its underside a recess, in particular a concave, conical edge outside the valve seat. The sealing body is thus carried for a certain time by the gas or liquid emerging from the outlet.

An embodiment of the invention is illustrated in an axial section in the drawing and is described in more detail below.

The low-pressure safety valve has a valve body 1, bolted together from several parts, the interior space 2 of which is lined or coated on its inner walls with a plastic resistant to aggressive media. This plastic is preferably PTFE, PFA or FEP. Into the interior space 2 extends from below a vertical cylindrical or conical inlet 3, lined with the same plastic material, which terminates at the top in an annular valve seat 4. On the valve seat lies a sealing body 5 of an identical or similar plastic material which seals the valve seat 4 tight upon contact with it.

The plastic material of the sealing body 5 forms a molded shaft 6 projecting vertically upward with a coaxial vertical inner bore 7 within which lies a guide rod as the guide part 8. The guide rod is immovably fixed at the upper end of the valve body 1.

The vertical guide part 8 is jacketed with the abovementioned resistant plastic so that the diameter of the guide part is only slightly less than the inner diameter of the inner bore 7. The plastic of the jacket surface of the guide part 8 forms two annular projections 10, so that the guide part 8 has only two guide zones with which it contacts the inner bore 7. In this way, a great smoothness of the vertical movements of the sealing body 5 is achieved.

Along the cylindrical outer side of the shaft 6 lie four annular weights 9, each jacketed with the abovementioned plastic, which are pushed onto the shaft 6 from above. On the topmost annular weight 9 lies an annular disc 11 of the above mentioned plastic secured by a round cord 12, which, in the embodiment, lies in an upper annular groove 13.

The shaft 6 has along its outer side several annular grooves 13 at regular intervals, whereby the spacing of the annular grooves relative to one another corresponds to the height of the annular weights 9, so that the annular disc 11 can be fixed securely by the round cord 12 at the height on the shaft 6 corresponding to the respective number of weights 9.

At the lower end of the inner bore 7 is arranged a horizontal venting bore 14 connecting the inner bore with the interior space 2.

At the outer edge of the sealing body 5 is fastened a ring 15 of the abovementioned plastic, the underside of which rises conically inward so that the ring 15 gives the sealing body 5 a bell shape, such that in the opened condition the sealing body as a lifting bell ensures that the liquid or gas flow keeps the valve open.

In this way, the guidance of the sealing body, respectively the valve plug, is accomplished along a guide, respectively valve rod 8, that is immovably fixed to the bonnet and thus the body of the valve. The rod 8 does not travel but is a static component cantilever-mounted and centered in the upper bonnet of the body. The rod 8 is preferentially manufactured from metal. The valve interior space 2 including the valve rod 8 is coated with plastic lining resistant to aggressive media, for example PTFE, PFA, FEP, etc.

The shaft 6 of the sealing body is hollow-drilled. Within this drilling the sealing body is guided along the valve rod. This permits lodging of the valve plug in the housing as close as possible to the sealing surfaces of the sealing body of the valve seat so that the sealing body and the valve seat are optimally centered. In this way, a precise response characteristic upon opening and good sealing upon closing are achieved. The loading weight is also guided along its entire length, thus avoiding any tilting.

The weights are metallic rings jacketed with plastic. Due to its relatively high density compared with plastic, the metal results in small-volume weight dimensions, so that the overall valve dimensions can also be kept relatively small. Jacketing with plastic ensures chemical resistance to aggressive media and permits the use of an inexpensive metal core, since there is no need for resistant special metal alloys.

The weight consists of several, preferentially four, rings stacked one above the other. It is thus possible to vary the trip pressure of the valve by adding or removing one or more weights. In particular, this facilitates subsequent adaptation of valves already in use.

What is claimed is:

1. A safety valve, in particular for low pressures and aggressive media, with an inlet ending at the top in a valve seat upon which lies in a sealing manner a weight-loaded sealing body, whereby a certain overpressure below the valve seat and/or a certain under pressure above the valve seat causes the sealing body to lift, characterized in that:

the sealing body forms at its upper end a shaft projecting vertically upward which is guided along or within a vertical part fixed immovably to the valve body, and that alone or on the shaft are fastened two or more detachable weights, the upward projecting shaft comprises a vertical inner bore open at the upper end in which lies a rod fixed immovably to the valve body, the rod is jacketed with a material resistant to aggressive media, the shaft annular weights lie one above the other surrounding the shaft, and are jacketed with or consist of a material resistant to aggressive media, and above the weights lies a disc, particularly of a material resistant to aggressive media, which is secured on the shaft by a round cord or a circlip.

2. A valve according to claim 1, characterized in that the outer side of the shaft comprises several annular grooves at intervals corresponding to the heights of the weights.

3. A valve according to claim 1, characterized in that the rod in the inner bore of the shaft contacts the said inner bore with only two annular projections.

4. A valve according to claim 1, further characterized in that an internal recess of the shaft is connected with the valve interior space via at least one venting bore.

5. A valve according to claim 1, characterized in that the sealing body comprises on its underside a recess, in particular a concave, conical edge, outside the valve seat.

* * * * *